United States Patent [19]

Smylie et al.

[11] 3,806,617

[45] Apr. 23, 1974

[54] PROCESS FOR PREPARING LICORICE TYPE CANDY

[75] Inventors: Charles Albert Smylie, Summit, N.J.; David Howard Rest, Newton Centre, Mass.

[73] Assignee: Y & S Candies, Inc., Brooklyn, N.Y.

[22] Filed: Nov. 24, 1971

[21] Appl. No.: 201,889

[52] U.S. Cl. ............................... 426/380, 426/516
[51] Int. Cl. ........................... A23g 3/00, A23g 3/02
[58] Field of Search ...................... 99/134 R, 199 R

[56] References Cited
UNITED STATES PATENTS

| | | | |
|---|---|---|---|
| 1,927,041 | 9/1933 | Mayhew | 99/134 |
| 3,486,469 | 12/1969 | Recas | 99/134 |
| 3,481,284 | 12/1969 | Cambanis | 99/134 |

*Primary Examiner*—A. Louis Monacell
*Assistant Examiner*—J. M. Hunter

[57] ABSTRACT

Producing licorice candies by rapidly drying a cooked licorice type candy formulation in a thin film at a temperature of between about 215°–255°F between two rotating circular surfaces, removing the dried film, shaping and cooling the shaped, dried product.

6 Claims, 1 Drawing Figure

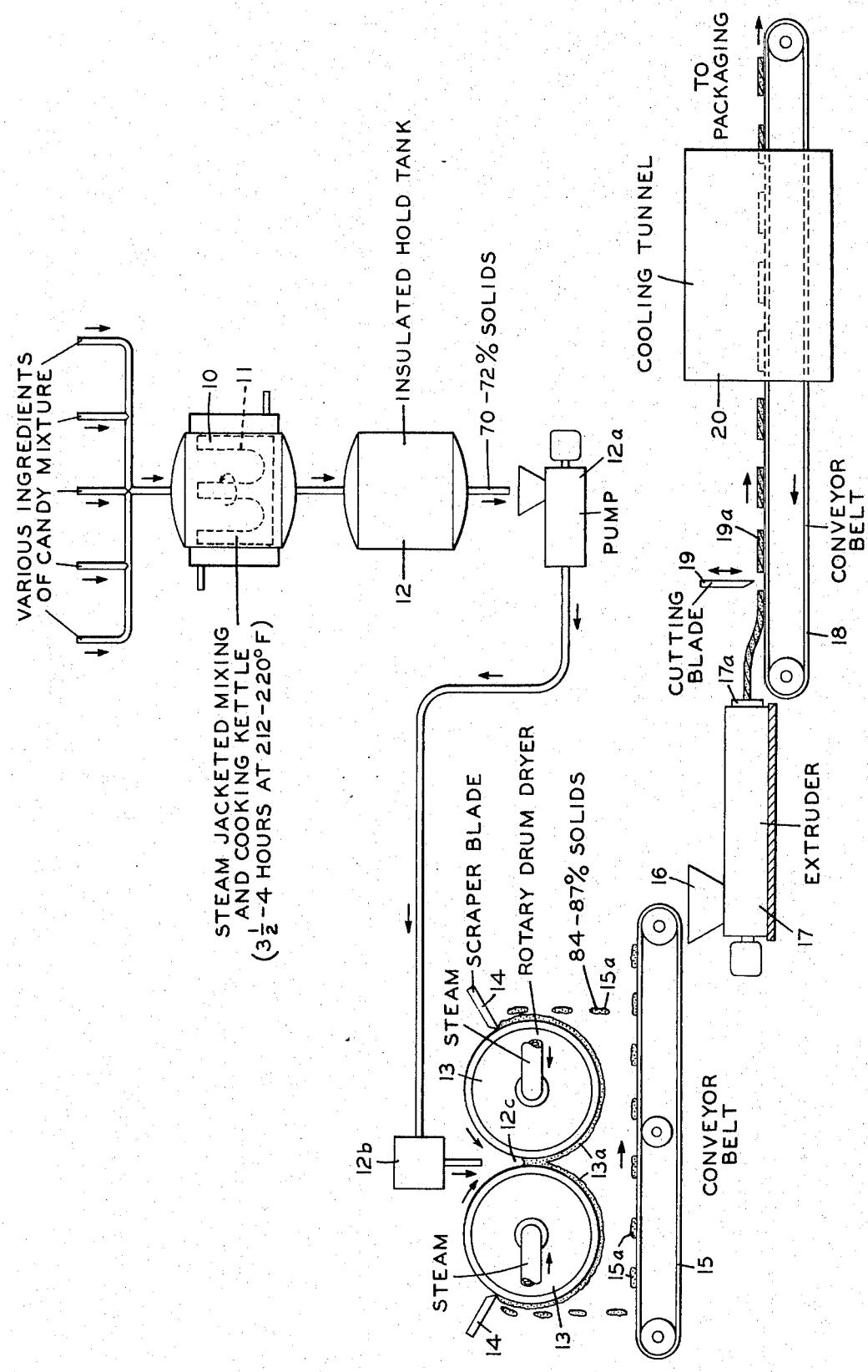

PROCESS FOR PREPARING LICORICE TYPE CANDY

BACKGROUND OF THE INVENTION

This invention relates to a process for preparing a licorice type candy. At the outset, it is to be understood that the term "licorice type candy" refers to a soft, chewy candy of a prescribed texture and does not necessarily have to include licorice as a flavoring agent. The term "licorice type candy", as used in the art, refers not to the flavor of the candy but to the soft, chewy texture of the candy. For example, it is possible to have licorice type candies which contain no licorice whatever, but instead contain a variety of other natural or artificial flavoring agents such as, for example, chocolate, strawberry, or spearmint.

The desired texture of a licorice type candy is derived by including in the mixture used to prepare the candy, major amounts of flour, cane sugar, and corn syrup. Such mixtures can also contain molasses in major amounts; moreover, a part or all of the flour can be replaced by starch.

If the candy is to have a licorice flavor, licorice will also be added in a major amount. However, if the candy is not to have a licorice flavor, licorice will be omitted and flavoring is obtained from minor amounts of natural or artificial flavoring agents.

It has been the practice to prepare licorice type candies by a time consuming and tedious batch method wherein the ingredients of the candy mixture are added to a suitable kettle, cooked for a prescribed period of time, held overnight and extruded or otherwise formed into the desired shape of the candy, and then dried overnight to the desired solids content; the high solids candy is then cooled to minimize undesirable tackiness and stickiness of the candy. At this point, the candy is ordinarily packaged.

The patch process is extremely time consuming due to the lengthy holding and drying steps which are required. To rapidly remove moisture from the candy in the cooking kettle requires high temperatures which can cause undesirable caramelization of the candy. As a result, the candy is preferably dried at relatively low temperatures but for long periods of time, i.e., 24 hours, in order to avoid the undesirable effects of caramelization. If the candy is subjected to hot air drying at high temperatures, after extrusion of the candy, in an attempt to dry it quickly, the candy tends to case harden forming a thick crust which may cause the candy to overdry and become hard and brittle. This type of drying would still require relatively long times and would not fit conveniently into a continuous system.

It is an object of this invention, therefore, to provide a continuous process for preparing licorice type candies characterized by a continuous drying step of very brief duration which can be carried out without producing caramelization in the candy.

This and other objects of the invention will be apparent from a complete reading of this specificcation.

SUMMARY OF THE INVENTION

In accordance with the process of this invention, a typical licorice type candy mixture, which has been heated and cooked in accordance with known procedures, is formed into a thin film which is heated at a temperature between about 215° to 225°F. for very brief periods of time to remove sufficient amounts of water to produce the required solids content in the candy without producing a caramelization effect in the candy. The heated film is then collected and formed into any desired shaped form such as, for example, a tube, rod, or a sheet; the candy is then cut into size, cooled, and packaged.

By forming the candy formulation into a thin film prior to heating and drying it, it becomes possible to obtain excellent heat transfer throughout the entire film permitting the heat to permeate the film and volatilize the required amount of water in relatively short times which are sufficiently brief to substantially eliminate caramelization even when relatively high temperatures are employed. As higher temperatures are employed, less heating time is required whereas, when lower temperatures are used, a somewhat longer heating time is required, the heating time being generally inversely proportional to the temperature to which the film is heated.

BRIEF DESCRIPTION OF THE DRAWING

The drawing depicts a schematic flow sheet illustrating a preferred embodiment of the process of this invention.

DESCRIPTION OF THE PREFERRED EMBODIMENTS

Referring to the accompanying drawing, the various heat insensitive ingredients of a typical licorice type candy mixture are added to a mixing and cooking kettle 10 which is provided with a steam heated jacket and a wall scraping agitator blade 11. The ingredients added to kettle 10 are then mixed together by agitation and cooked in accordance with known procedures. It is essential during the cooking step to continuously remove the candy mixture from the walls of kettle 10 to insure good heat transfer into the contents of the kettle and to avoid burning the candy.

In a typical licorice type candy mixture, the major ingredients comprise flour, cane sugar, and corn syrup in amounts of about 25–35 percent, 15–25 percent, and 35–45 percent by weight, respectively, on a solids basis.

The mixture can also contain from about 20 to 30 percent by weight molasses on a solids basis and minor amounts of a variety of other additives such as, shortening, emulsifiers, salt, natural and artificial flavors, and preservatives. If the candy is to have a licorice flavor, licorice is added in a major amount typically ranging from about 1 percent to 10 percent by weight on a solids basis. If the candy is to have a flavor other than licorice, licorice will be omitted and replaced by smaller amounts of the ordinarily more concentrated natural or artificial flavor which the candy is to have.

A typical licorice type candy formulation is shown below:

| Ingredients | % Solids by Weight |
| --- | --- |
| Flour | 25–35 |
| Cane Sugar | 15–35 |
| Corn Syrup | 35–45 |
| Shortening | 1–3 |
| Emulsifier | 0.1–0.4 |
| Molasses | 20–30 |
| Salt | 0.3–1 |
| Natural and Artificial Flavors | 0.1–0.3 |

| | |
|---|---|
| Preservatives | 0.1–0.3 |

In the above formulation, it is also possible to replace part or all of the wheat flour, and preferably from 4 to 8 percent of the flour, with starch. A typical shortening is one of the vegetable origin having a melting point of about 112°F. Typical emulsifiers include lecithin and mono-and di-glycerides. Illustrative natural flavors include chocolate, vanilla, citric acid, spearmint, and anise. Illustrative artificial flavors include strawberry, cherry, and grape imitations. Illustrative preservatives include potassium sorbate.

The various ingredients of the candy mixture are added to kettle 10, along with sufficient water to produce a mixture in kettle 10 having a solids content ranging from about 60 to 80 percent and preferably from about 70 to 72 percent. Ordinarily, any heat sensitive ingredients in the mixture such as, for example, various flavoring agents, are not added until near the end of the cooking period when the cooking of the mixture is substantially completed.

The ingredients in kettle 10 are typically heated with agitation to about the atmospheric boiling point of the mixture, e.g., 200° to 225°F. and preferably from about 212° to 220°F., for a period of time sufficient to cook the mixture; the mixture is ordinarily cooked in from about 3 to 4½ hours and preferably from 3½ to 4 hours. The purpose of the cooking operation is to gelatinize the starches and to break apart any agglomerates of starch so as to provide a uniform smooth viscous mixture in kettle 10.

After the mixture has been adequately cooked, it is transferred to an insulated hold tank 12 where it is maintained at substantially the same temperature as in kettle 10. At this point, the mixture contains a solids content ranging from about 60 to 80 percent and preferably 70 to 72 percent.

The hot viscous candy mixture is then formed into a thin film by feeding it to pump 12a which transports the mixture continuously from tank 12 to a discharge manifold 12b which discharges the mixture uniformly into the nip 12c, and across the entire width of, a pair of adjacent rotary drum driers 13 which are rotating in opposite directions. As the mixture enters the nip 12c between the rotating driers, it is formed into a thin film 13a having a thickness corresponding approximately to the distance between the surfaces of the driers at their closest point. The thickness of the film can vary from any finite thickness up to about 0.1 inch and is preferably maintained at a thickness of about 0.0035 to 0.0075 inches.

Drum driers 13 are heated by steam which is injected into their hollow interiors. Heat is supplied to the film 13a from the hot surfaces of the driers 13 in an amount sufficient to maintain the temperature of the film 13a at about 215° to 255°F., and preferably about 220° to 240°F. The temperature of film 13a closely approximates that of the steam within the drum driers 13 and is ordinarily about 5°F below that of the steam temperature. Thus to produce film temperatures in the range of 215° to 255°F, steam temperatures in the range of about 220° to 260°F are employed.

The film 13a is retained on the rotating surfaces of the drier and heated for a period of time sufficient to remove enough water to raise the solids content of the film to about 80 to 90 percent and preferably to 84 to 87 percent by weight. If higher drier temperatures are employed, less heating time is necessary whereas if lower temperatures are employed somewhat longer heating times will be required. The film 13a is typically heated for about 10 to about 30 seconds and preferably for about 12 to 17 seconds. By drying the candy mixture as a thin film, the mixture is quickly and effectively dried without causing undesirable caramelization in the candy.

Upon completion of the heating step, the film 13a is scraped from the surface of drums 13 by scraper blades 14 onto an advancing belt 15 which collects the pieces 15a of hot dried film 13a and transports them to the hopper 16 of extruder 17. Extruder 17 is a conventional extruder equipped with an extrusion orifice 17a of whatever configuration is necessary to produce the desired shape for the finished candy product. For example, the candy may be extruded as a tubular form, a rod, a sheet or as twisted splines. The dried candy mixture can be converted into a shape form using equipment other than an extruder such as, for example, molding equipment, or film forming rolls. It is ordinarily not necessary to supply additional heat to the candy as it passes through the extruder since it will usually retain a sufficient amount of heat from the drying step.

As the candy emerges from the extrusion orifice 17a, it is collected upon an advancing conveyor belt 18; it is then cut to desired length or size by cutting blade 19. The cut pieces 19a of candy are then cooled to about room temperature by transporting them through a cooling tunnel 20 through which is circulated, in a direction countercurrent to that of the advancing pieces of candy, a cold vapor, such as air, at a temperature of 35° to 45°F. and preferably about 40°F. The purpose of the cooling step is to firm up the candy, reduce the tackiness of the candy, prevent it from sticking to adjacent pieces, and to allow it to be handled and packaged in a convenient manner. The cooled candy is then packaged in a standard manner.

The following example is provided to further illustrate the process of this invention. The following example and detailed description of the process presented hereinabove are illustrative only and such modifications and alterations as would be suggested to one skilled in the art are contemplated to fall within the scope and spirit of the claims appended hereto.

EXAMPLE

A licorice type strawberry formula was prepared in a steam jacketed premix slurry kettle. For this mixture, 10.0 parts by weight corn syrup (44° Baume), 4.7 parts by weight liquid sugar (67° Brix), 4.6 parts by weight soft wheat flour, 0.631 parts by weight vegetable shortening, 0.107 parts by weight salt, and 7.4 parts by weight water were added to the premix slurry kettle. These ingredients were then stirred until completely mixed. After mixing, the agitator on the premix kettle remained in motion. The steam was introduced into the jacketed section of the kettle until the temperature of the mixture was 160°F.

The mixture was then pumped from the slurry kettle to the steam jacketed cooking kettle. The agitator on the cooking kettle was placed in motion and remained in motion during the entire cooking cycle. The lids on the kettle were closed. The steam was then introduced into the jacketed section of the kettle. The steam pressure was brought to and remained at 65 psi for 3½ hours. After 3½ hours the steam was turned off. The temperature of the mixture was 220°F. This mixture is hereinafter referred to as the "candy stock".

The lids on the cooking kettle were then placed in the open position. With the agitator in motion, the candy stock was allowed to cool for ½ hour. The temperature of the candy stock was about 185°F. and the solids content was about 72 percent by weight.

A dark red color, a preservative, and citric acid were prepared into a premix. For each 100 parts of candy stock, 0.022 parts by weight of dark red color, 0.065 parts by weight of citric acid and 0.03 parts by weight of preservative were dissolved in 15 pounds of hot water. The resulting mixture is hereinafter referred to as the "color, acid, preservative premix".

The following ingredients were then added to the candy stock. For each 100 parts candy stock, 1.08 parts by weight of glycerine, and 0.190 parts by weight of lecithin were first added. These ingredients were allowed to mix thoroughly for 15 minutes. The "color, acid, preservative premix" was then added and for each 100 parts by weight of candy stock, 0.25 parts by weight of imitation strawberry flavor was also added. The ingredients were allowed to mix thoroughly for an additional 10 minutes. At this stage, all the ingredients for a strawberry formulation had been added. This complete candy formulation is hereinafter referred to as the "Wet Candy".

The wet candy was pumped from the cooking kettle to the insulated holding feed vessel. The wet candy was then pumped, as required, to the twin drum rotary drier.

The twin drum rotary drier consisted of two 42 in. diameter chrome plated drums, 120 inches long. The drums were hollow inside so that steam could be introduced to heat the candy to the desired temperature.

Steam at about 15–20 p.s.i.g. (220°–230°F) was introduced into the hollow interior of the drums. The drums are parallel to each other with an adjustable gap between them of from 0.007 inches to 0.15 inches. The drums rotate in opposite directions. The RPM of the drums is adjustable through a variable speed reducer. Each drum is equipped with a Teflon coated scraper blade for removing the candy.

The wet candy was introduced at the top of the drum drier between the two drums. As the drum rotated, the wet candy was forced into the nip between the two drums. The candy stuck to the drums as they rotated, and was scraped off the drum by the scraper blades. While the thin film of candy was on the drums, the heat from the drum drove off moisture so that the solids content of the candy coming off the drum drier was between about 84 and 87 percent.

The candy at the scraper blade rolled up as it was scraped off the drum. When this roll of candy reached a diameter of 2.5 to 3 inches, it hit a Teflon take-away blade which pulled the candy from the drum, and allowed it to fall onto a Teflon coated belt conveyor. The candy at this point was in 3 inch diameter rolls, 120 inches long, at a temperature of about 212°F. ± 5°F.

The belt conveyor carried the candy into a hopper above the extruders. The candy was fed into the extruder by gravity from the hopper. The extruder then formed the candy into the desired shape, and deposited the candy onto a continuously advancing belt for conveyance to the cooling tunnel.

The extruder consisted of two parallel compression screws that pushed the candy through a die head. The die head had rotating nozzles. This gave the candy a twisted effect. Each nozzle also had a tube in the center through which air was pumped. This allowed the extrusion of a hollow piece of candy.

The candy, after being extruded onto the cooling tunnel belt, was cut into the desired length by means of a rotary cutter. The candy then passed through a cooling tunnel 80 feet long where it was cooled from 212°F. ± 5°F. to 75°F. ± 5°F. by contact with a countercurrent flow of cooled air. The cooling tunnel had a capacity of 30 tons of refrigeration. After leaving the cooling tunnel, the candy was packaged for shipment.

What is claimed is:

1. A process for making a soft, chewy licorice candy which comprises
   a. preparing about a 60–80 percent solids content aqueous blend comprising flour, sugar, corn syrup and flavoring;
   b. cooking the blend at a temperature and for a time sufficient to gelatinize the starch present in the blend and to form a uniform viscous mixture;
   c. feeding the cooked mixture to the nip between two rotating circular surfaces to form on the circular surfaces a thin film of the cooked mixture;
   d. heating the film while it is on the rotating circular surfaces, without stirring the film, at a temperature of about 215°–255° F. for a period of time sufficient to remove the desired amount of moisture without causing caramelization;
   e. removing the dried film from the circular surfaces;
   f. shaping the dried film into the desired configuration of the candy product and
   g. then cooling the shaped dried candy product.

2. The process of claim 1 wherein the film is heated for about 10–30 seconds.

3. The process of claim 1 wherein the film thickness is less than about 0.1 inch.

4. The process of claim 1 wherein the film thickness is about 0.0035–0.1 inch.

5. The process of claim 1 wherein each of the two rotating circular surfaces forms a part of a rotating steam-heated drum drier.

6. The process of claim 1 wherein the film thickness is about 0.0035–0.1 inch, the film is heated for about 10–30 seconds at about 220°–240° F. and each of the two rotating circular surfaces forms a part of a rotating steam-heated drum drier.

* * * * *